United States Patent [19]
Fimbault

[11] 3,738,532
[45] June 12, 1973

[54] APPARATUS FOR AUTOMATICALLY DISTRIBUTING LIQUID FEED RATIONS

[76] Inventor: Serge Fimbault, Dordogne, Saint Hilaire D'Estissac, France

[22] Filed: Mar. 8, 1972

[21] Appl. No.: 232,776

[30] Foreign Application Priority Data
Mar. 10, 1971 France .............................. 7108592
Nov. 8, 1971 France .............................. 7139907

[52] U.S. Cl. ................................ 222/63, 119/52 B
[51] Int. Cl. ............................................. B67d 5/08
[58] Field of Search ................. 222/63, 17, 59, 71; 119/51, 51.11, 51.1, 52 B

[56] References Cited
UNITED STATES PATENTS
3,465,725  9/1969  Maclay .............................. 119/52 B
3,664,302  5/1972  Wienert ............................. 119/52 B
3,628,506  12/1971  Glasbergen ...................... 119/51.11

Primary Examiner—Robert B. Reeves
Assistant Examiner—James M. Slattery
Attorney—Arnold B. Christen, Eugene Sabol and George H. Mitchell, Jr.

[57] ABSTRACT

Apparatus for automatically distributing liquid, or semi-liquid, feed to the feed boxes of a series of animals includes a proportioning mechanism which can be programmed to distribute different specific proportions of feed to each feed box; the feed being delivered by means of a piston and the displacement of the piston being controlled by adjustable stops attached to the surface of an intermittently advanced cylindrical programming device which is synchronized with the movement of the feeding device along the feed boxes.

4 Claims, 11 Drawing Figures

APPARATUS FOR AUTOMATICALLY DISTRIBUTING LIQUID FEED RATIONS

The present invention relates to an automatic apparatus for automatically proportioning and distributing liquid or semi-liquid feed rations intended for animals in a shed, and relates more particularly to a new device for controlling the proportioning-distributing cycle consecutive to the stopping of the apparatus opposite each individual box.

The present invention has for its object to enable a quantity of liquid, which is well defined due to a very simple programming, respecting the individual feed of each animal, to be distributed to each animal without manual aid.

The invention will be more readily understood upon reading the following description with reference to the accompanying drawings.

Figure 1:
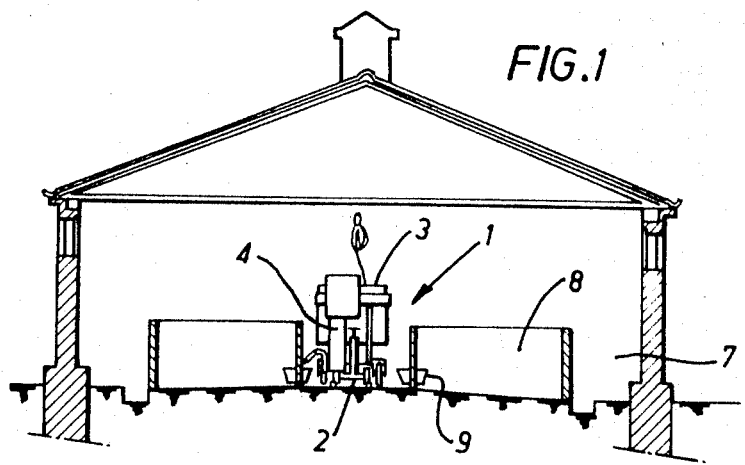
FIG. 1 is a sectional view of a stable comprising two rows of boxes.
Figure 2:
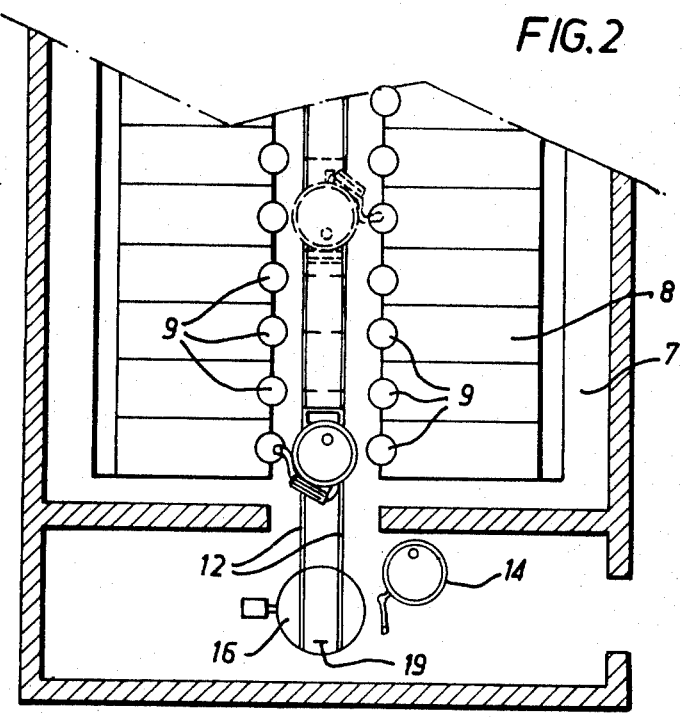
FIG. 2 is a part plan view of the stable of FIG. 1.

Referring now to the drawings, FIGS. 1 and 2 illustrate a mode of using the apparatus according to the invention in a shed in which battery calves are kept, distributed symmetrically in two rows. These Figures show an apparatus 1 according to the invention on a movable carriage 2, with a feed vat 3 and a proportioner-distributor device 4. Two rows of boxes 8 of a shed 7 are also seen, as well as the individual troughs 9, disposed on each side of a pair of guide rails 12, placed in the central aisle. In the embodiment given by way of example, there is also seen a rotating platform 16 intended on the one hand for transferring the apparatus from the ground onto the rails and on the other hand for executing a half turn by the apparatus, thus permitting an apparatus to have only one distributing channel for successively supplying the troughs of the left-hand row, then the troughs of the right hand row of the shed and vice versa. Near the rotating platform, there is provided a feed tank 14 intended for preparing, for example, reconstituted milk or other liquid or pasty feed product, said tank being provided with a mixer and a device for automatically regulating the temperature of the product that it contains. An end-of-movement stop for the carriage is provided on each end of the rails. Only the beginning and end stop 19 can be seen in FIG. 2.

Figure 3:
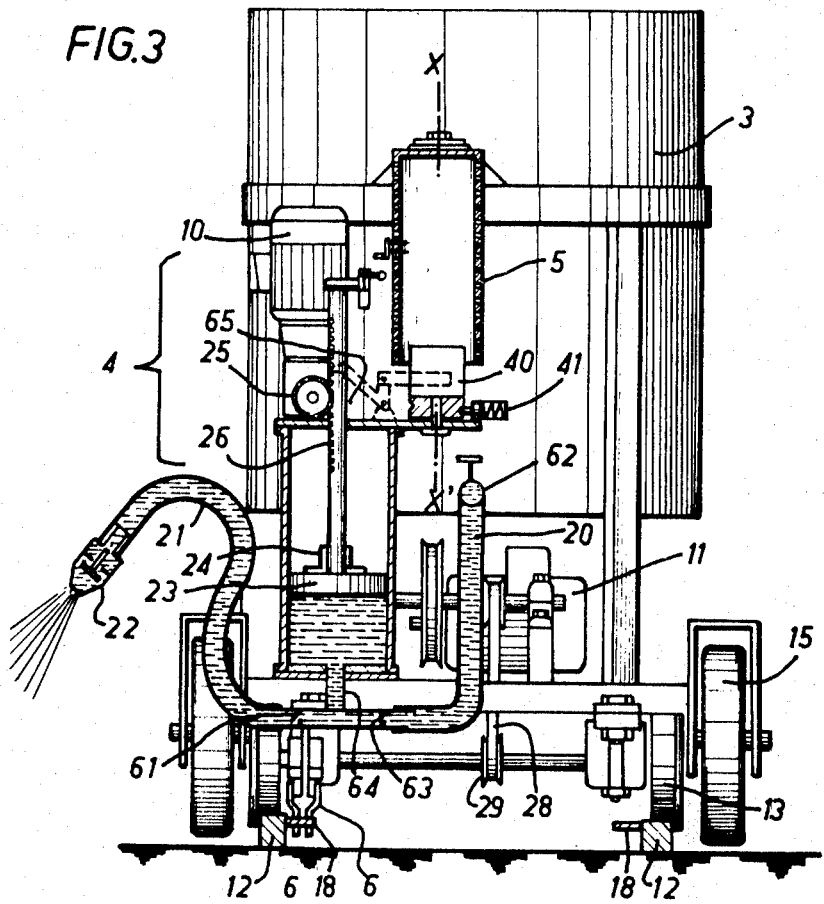
FIG. 3 is a view of an embodiment of the apparatus according to the invention.
Figure 4:
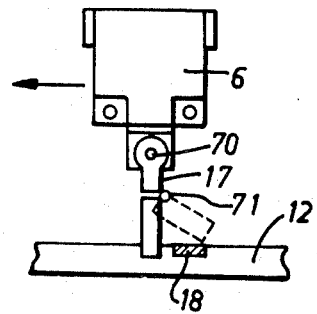
FIG. 4 is an enlarged view of the retractable finger controlling the stopping of the carriage and the starting of the sequence of proportioning, distributing and restarting operations of the carriage.
Figure 5:
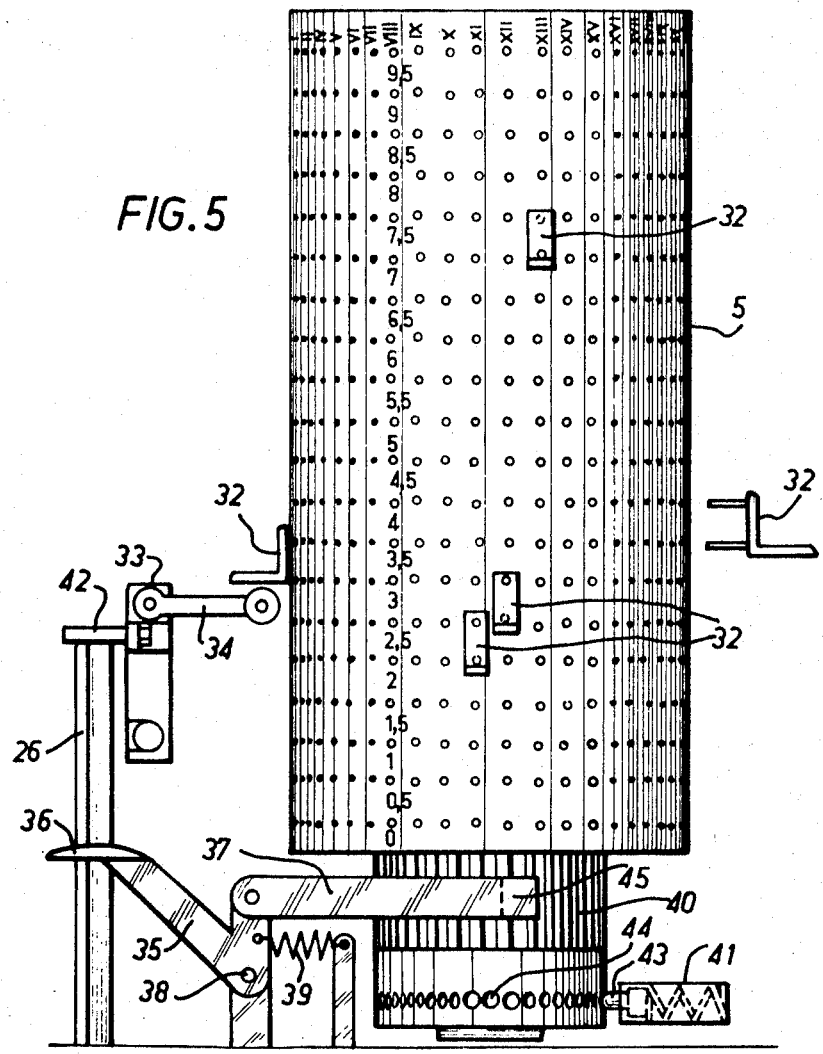
FIG. 5 shows an elevational view of the removable programming device, consisting of a removable and programmable drum.
Figure 6:
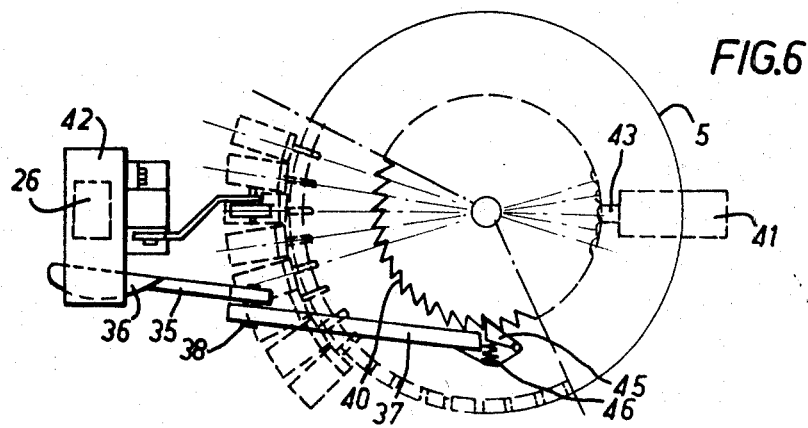
FIG. 6 is a plane view, with part section along V-V of device of FIG. 5.

FIG. 3 schematically shows a carriage 2 actuated by a drive motor 11 by means of a set of discs and a belt 28, thus acting on shaft 27 of the wheel train 13 ; a proportioner-distributor device 4 controlled by a programmer device 5 constituted of a vertical, removable drum perforated with regularly spaced holes, the structure of which will be seen in detail in FIGS. 5 and 6. This drum supports stops intended to define the upper limit of the stroke of the feed piston in cooperation with a switch 33 in the upper part of the rack 26 actuating the piston 23. The pump body is placed on the carriage with, above it, a motor 10 acting on the piston 23 by means of a geared pinion 25 actuating said rack 26.

The pumping means of said proportioner-distributer device consists in a movable piston 23 effecting, in stopped position in front of each box, a to-and-fro movement in the cylinder of the pump, in the base of which are connected a suction channel 20 with its valve 63, and a delivery channel 21 with its valve 61, directly or by means of a T-joint 64.

By its other end, the channel or pipe 20 is connected to the feed vat 3 provided with a cock 62 or the like. The channel or pipe 21 which distributes the proportioned liquid into the animal's container is terminated by a valve closure provided with a tap nozzle 22.

A finger or feeler 17 tipping in one direction along axis 70 and retracting in the opposite direction along axis 71, controls a double switch 6 stopping the drive motor of the carriage and starting the drive motor of the pump in the sense of suction. This feeler thus controls the above-mentioned cycle of operations in the forward sense and retracts when the carriage returns.

FIGS. 5 and 6 show the very simple electro-mechanical means for controlling a proportioning-distributing cycle used and effected by the programming drum according to the invention, working in cooperation with the rack shaft of the pump piston, together with suitable electric switches. The programmer device 5 comprises a vertical hollow cylinder perforated with regularly spaced holes, distributed in rows and columns on the periphery ; this hollow cylinder is terminated at its base by a ratchet wheel 40 intended to permit the advance by rotation of the cylinder of one catch per proportioning-distributing cycle.

The programming drum and its drive wheel are fixed above the cylinder of the pump near the rack shaft of the pump piston, so as to cooperate with the finger or feeler 34 of the switch 33 controlling the reversing of the feed motor.

The stops 32 regulate the individual feed dose and their mode of operation is illustrated in FIG. 5.

It may be seen that each of them occupies a column corresponding to a box and is adjustable in height ; the levels of the circles markes 0, 0.5, 1, 1.5 . . . 8.5, 9.00 and 9.5 1 each indicate the volume of liquid which will be automatically proportioned.

In the example, a series of volumes has been shown ranging from 0 liters to 9 ½ liters by unitary progressions of half a liter, but it is obvious that a finer division, in quarter liters, is also possible with this system.

Thus, according to the programme illustrated, and animal located in box 11 will receive a ration of 2 liters ; the one in box 12 will receive 2.5 liters and the one in box 13, 7 liters, and so on.

The left-hand part of FIG. 5 clearly shows the device for advancing the ratchet wheel 40, integral with the programming drum.

The rack head 42 is a projecting plate which bears a switch 33 provided with a feeler 34. When the pump sucks the feed liquid, the rack rod 26 rises until said feeler meets, on its path, a stop 32, this having for an effect to act on the switch 33 which reverses the direction of the feed motor. The geared pinion 25 rotating in opposite direction causes the rack to descend, delivering the proportioned liquid into the chosen animal's trough. The head of the rack, on descending, abuts at a certain moment on the head 36 of a V-bent lever arm 35 ; this bent arm is articulated about a fixed point 38 and is extended by a horizontal arm 37 which moves from right to left. This horizontal arm is provided, at its end, with a catch 45 (retractable thanks to a spring 46) which, during this action, makes it possible for the programming drum to be pivoted by one catch, thus placing the contact defining the ration of the following animal in active position. Simultaneously, when the rack 26 has finished descending, thus at the end of total delivery, the rack head 42 acts on a switch 65 (FIG. 3) controlling the stopping of the motor actuating the feed pump, and the restarting of the drive motor of the carriage. A return spring 39 returns said lever arm 35 to its initial position in the course of a new pumping, this having for an effect to place the catch 45 in the following notch of the ratchet wheel 40. A ball 43 of a positioning device 41 is a safety measure, provided to ensure the previously defined exact positioning of the programming drum.

Figure 7:
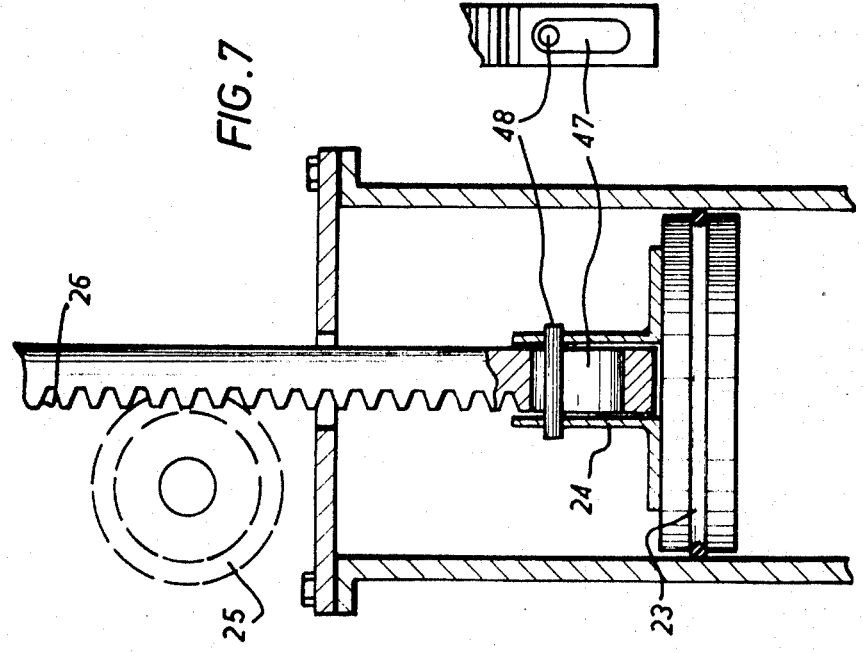
FIG. 7 is a schematic view of the geared pinion-rack assembly of the proportioning pump.

FIG. 7 shows the mechanical means used for enabling the rack rod to accomplish a to-and-fro cycle without driving the piston of the feed pump to which it is connected, in other words to effect a zero "feed" cycle, for example where there is an empty box.

To arrive at this result, the rack rod 26 has an orifice in the form of a button-hole, made in its lower part. A horizontal pin 48, fixed to the stirrup-shaped member 24 of the piston 23 passes through said orifice.

The free stroke of the rack rod 26 is consequently at the most equal to the dimension of the said orifice along its large axis. Furthermore, the zero level of the drum is regulated so as to permit said rack rod to effect a to-and-fro cycle without driving said piston, in order to make the programming drum pivot by one catch when there is no distribution to be made in a certain box.

According to the invention, the distributor pipe 22 ends in a valve or tap nozzle 22 which automatically opens and closes under the simple effect of a difference in pressure.

Figure 8:
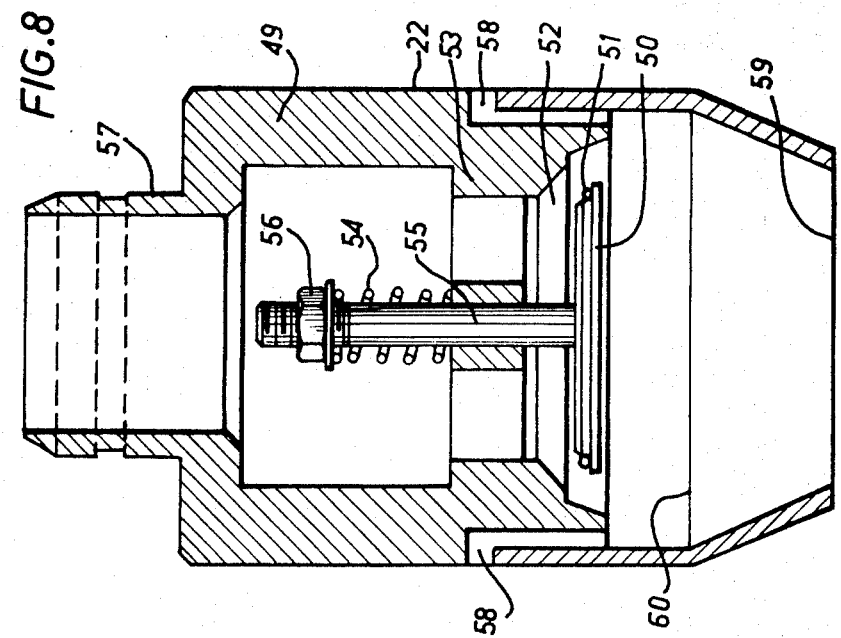
FIG. 8 is an enlarged view, in section, of the tap nozzle provided on the end part of the distributor.

FIG. 8 schematically shows the constitution of the tap nozzle 22, which comprises a sleeve 49 provided in its median part with an inner ring 53 in which slides a rod 55 fixed to a valve head 50 and a locking bolt or the like at its other end. Said rod 55 passes through a return spring 54. The sleeve 49 or valve body comprises, moreover, on its periphery, aeration channels 58, a ferrule 57 for connection to the feed pipe at one end and an aperture 59 whose diameter is smaller than the diameter of the sleeve 49 near the line 60 located slightly above.

Consequently, this tap nozzle ensures both the instantaneous and clean stopping of the flow of the liquid at the end of the delivery cycle of the pump at the same time as it eliminates, thanks to the eddy created at the output by the air sucked in through the aeration holes and through the rapid closure of the valve by the return spring provided with a sealing disc, the possible losses of liquid between each trough as well as losses by splashing.

The mode of operation of an apparatus for distributing liquid or like feed, provided with a programming device according to the invention, will now be described.

The apparatus will be considered as having finished its work in one building, and it is moved by any suitable means in another building, thanks to the train of pneumatic wheels enabling it to move over the ground. A ramp (not shown in FIG. 2) enables the movable carriage to be placed in position on the rails of the rotating platform 16. The vat 3 being filled and the delivery pipe oriented correctly and the apparatus connected to the electrical feed terminals, the drive motor of the carriage is started by pressing on the button controlling its starting. The carriage moves until the feeler at the base of the carriage meets the first catch fixed to the rail (left-hand rail in the example shown in the Fig.).

The tipping of said feeler acts on a double switch, this having for its effect on the one hand to stop the drive motor of the carriage and on the other hand to start the motor actuating the feed pump. This motor drives a geared pinion which causes the piston of the pump to rise by means of the rack-rod until the feeler fixed to the projecting part of the head of said rod meets the stop defining the volume of the ration of the animal occupying said first box ; the tipping of the feeler results in the feed motor being reversed ; the geared pinion driven in opposite direction then causes the head of the rod of the rack to be lowered, this resulting on the one hand in the proportioned ration of feed being delivered into the animal's trough and on the other hand in the programming drum being turned by one catch by means of the lever device cooperating with the ratchet wheel integral with the drum, thus placing in operating position for the following cycle, the stop fixing the proportioning of the ration of the animal in the next box and, finally, a double switch is actuated, which controls on the one hand the stopping of the motor of the feed pump and on the other hand the restarting of the motor driving the carriage, thus producing the beginning of a second sequence of operations similar to the first, which has just been described and so on up to the end of the first row of boxes, with reversal of the direction of drive of the motor driving the carriage at the end of the rails by means of a stop cooperating with an electrical switch provided for this purpose. On the return path, the said feeler is retracted at the catches fixed to the rail opposite each box, allowing the apparatus to return directly to its point of departure, i.e., on the rotary platform where an end-of-travel stop cuts the electric feed of the drive motor. Of course, the same sequential series of operations will be carried out by the apparatus when, after having turned the apparatus by 180°, it is restarted to feed the animals located in the right hand part of the aisle.

Figure 9:
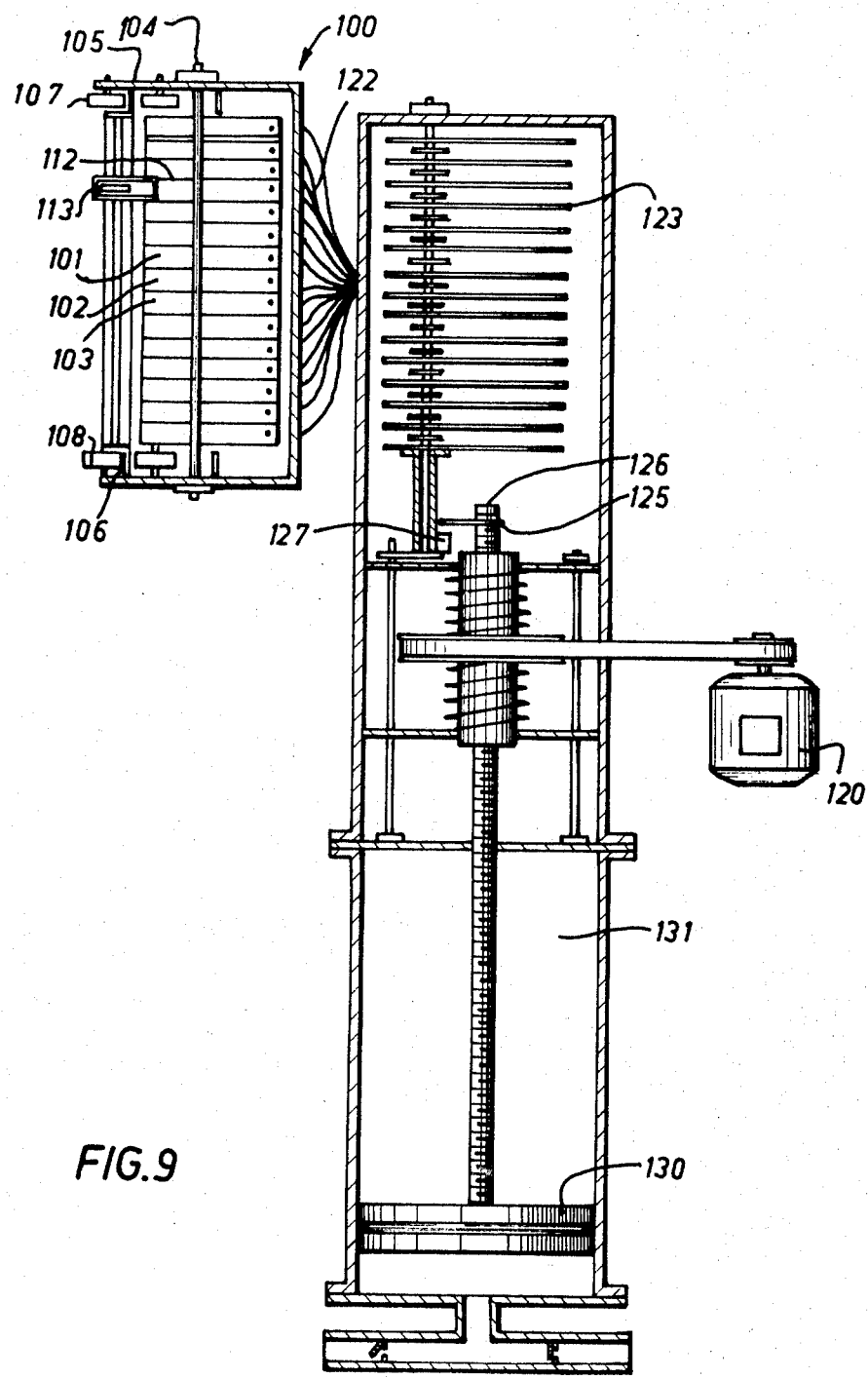
FIG. 9 is a view of a variant embodiment of the invention.

FIGS. 8 and 9 show a variant embodiment of the invention in which the device controlling the stop-start of the drive motor of the carriage and actuating and proportioning the distribution of liquid in each box, is constituted by a feeler assembly 100 comprising a plurality of contacts 101, 102, 103, mounted to rotate on an axis 104 ; the feeler is integral with the carriage and its displacement is guided by guide rails 105 and 106 receiving the rollers 107, 108. A catch 109 suitably positioned along the rods 110, 111 enables the feeler to be actuated. To this end, a catch device is positioned opposite each box to be fed.

Figure 10:
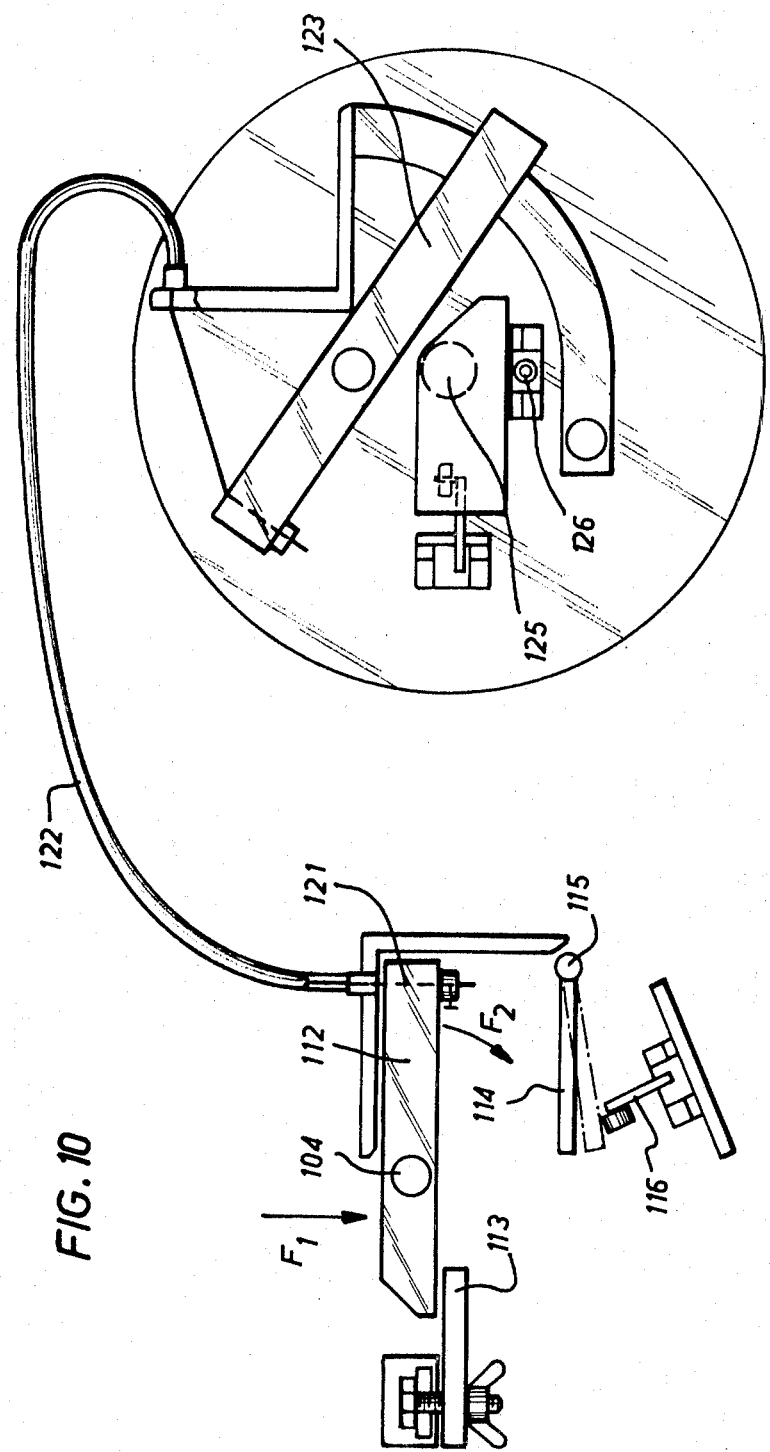
FIGS. 10 & 11 are detailed views of the control device of the variant embodiment of FIG. 9.
Figure 11:
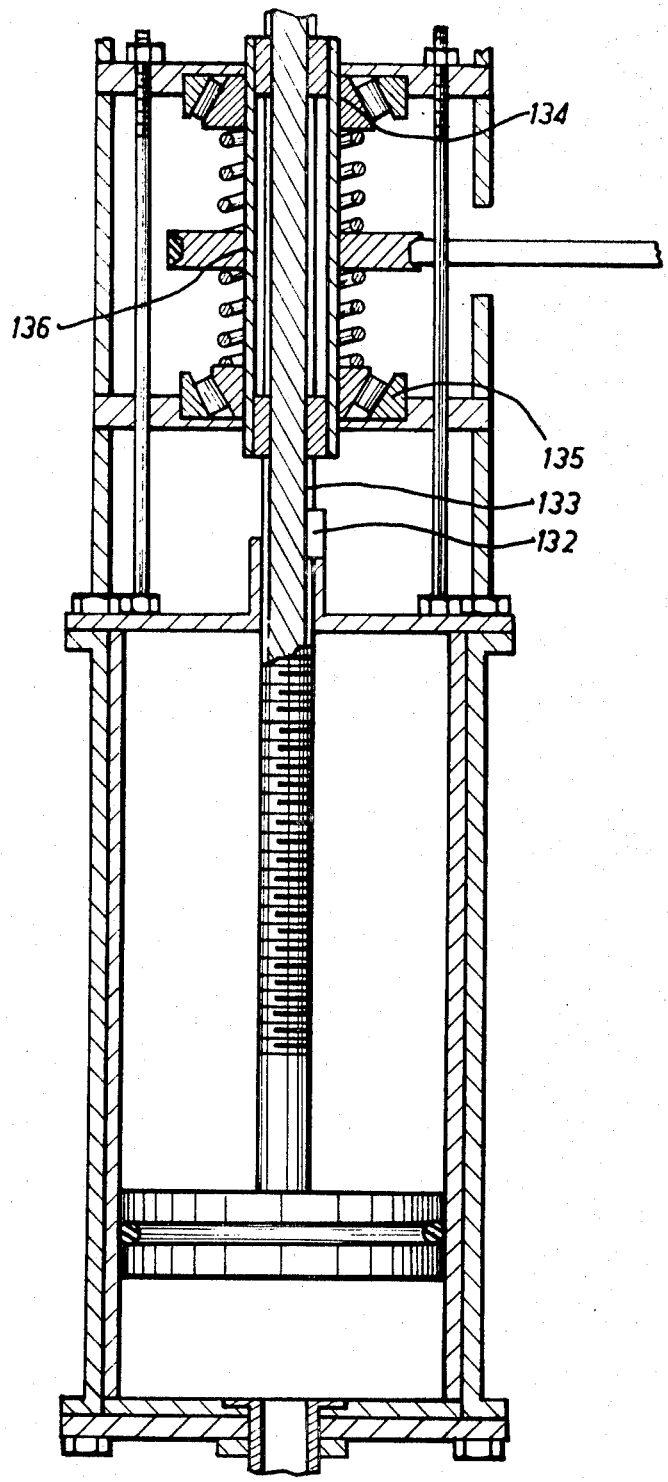

The operation will be more readily understood upon examining FIG. 10. When the carriage is advanced in direction of arrow F1, one of the contacts 112 of the feeler 100 abuts on the catch 113, this causing the rotation of the contact 112 in direction of arrow F2 around axis 104 ; the contact 112 bears on flap 114 which pivots about its axis 115 and actuates the switch 116. This latter then stops the motor driving the carriage and starts the motor 120 driving the piston rod.

However, the contact 112 in its rotation in direction of arrow F2 exerts a traction on cable 121 with sheath 122 and controls the rotation of the stop 123 corresponding to the contact along axis 124 and brought into active position above the axis of vertical displacement of the rod 125.

In its rising movement, the rod 125 brings the switch 126 integral with the upper end of said rod, in contact with the stop 123 placed in active position and thus limiting the height of the stroke of the piston 130 and consequently the quantity of liquid sucked into the body of the cylinder 131.

A lower switch 127 undergoes the action of the rod 128 integral with the upper end of the rod of the piston and brings about, when the rod of the piston is at the end of delivery stroke, both the stopping of the motor 120 driving the pump and the restarting of the motor driving the carriage.

The rod 131 is mounted to slide in height without being able to rotate, being blocked by the pin 132 inserted in the longitudinal groove 133 made along the rod ; the rod 131 is threaded and is mounted in a rotated nut 136 on two bearings 134, 135 by belt 137 moved by the motor 120 ; a double helical spring 138, 139 serves as an end-of-stroke shock absorber.

What I claim is:

1. An apparatus for automatically distributing individual, proportioned rations of liquid or semi-liquid feed intended for feeding animals in individual, aligned boxes provided with individual troughs, said apparatus comprising :
   a movable carriage and a first motor for driving said carriage ;
   guide rails for said carriage, which pass in line with said boxes ;
   a tank containing liquid feed product, mounted on said carriage ;
   a mixer device and device for regulating the temperature of the feed product and associated with said tank ;
   a pouring spout integral with said carriage jutting over the aligned troughs and connected by a conduit to the tank of feed product ;
   a suction-delivery pump with piston interposed on the conduit between the said tank and said pouring spout;
   a second electric motor driving said pump ;
   a programmed control device associated respectively with the motor actuating the carriage and with the pump and suitable for stopping the carriage opposite each individual box and starting the motor of the piston pump distributing the feed liquid, and for limiting the amplitude of the movement of the piston, thus proportioning the quantity of feed product distributed to each box,
   said programmed control device consisting of
   a feeler assembly comprising a plurality of contacts, stepped in height, each contact corresponding to the control of a determined quantity of feed product ;
   a set of guide rails disposed linearly in line with the boxes and suitable for receiving and guiding the feeler assembly, integral with the carriage ;
   a plurality of catch devices, each catch being suitable for cooperating with one of the contacts and being adjustable in height by sliding on a support rod and being suitable for actuating one of the contacts, a catch device being disposed on each individual box ;
   a switch controlling the stopping of the drive motor of the carriage and sensitive to the action of each of the contacts,
   a plurality of retractable stops stepped in height, each stop brought into active position being suitable for limiting the stroke of the piston rod,
   a plurality of sheathed steel cables connecting each of the contacts to each of said stops,
   so that the feeler assembly driven with the carriage and meeting a catch corresponding to a box is subjected to the action of the catch, suitably positioned in height, which causes the rotation of the corresponding contact, this latter actuating the switch controlling the stopping of the carriage and the distribution of liquid by the pump, and the placing in active position of a stop limiting the stroke of the piston.

2. An automatic distributing apparatus as defined in claim 1, in which the rod of the piston of the pump is constituted by a threaded rod provided with a longitudinal groove, a fixed pin integral with the chassis of the carriage penetrating in this groove and opposing the rotation of this rod, the drive motor of the pump being associated with a bearing screwed on said rod and driven in rotation by said motor, the rotation of the bearing causing the linear rising and falling movement of the rod, the upper end of the rod comprising a switch bearing on the stop placed in active position by the set of the corresponding contact, said switch controlling the reversal of the direction of rotation of the motor and the corresponding return of the rod of the pump into delivery position, the low end of the rod also comprising a switch suitable for controlling, when the rod arrives in low position and at the end of delivery, the stopping of the motor driving the pump and the starting of the motor actuating the carriage.

3. An apparatus for automatically distributing individual proportioned rations of liquid or semi-liquid feed intended for feeding animals in individual aligned boxes provided with individual troughs, said apparatus comprising :
   a movable carriage and a first motor for driving said carriage ;
   guide rails for said carriage, which pass in line with said boxes ;
   a tank containing liquid feed product, mounted on said carriage ;
   a mixer device and device for regulating the temperature of the feed product and associated with said tank ;
   a pouring spout integral with said carriage jutting over the aligned troughs and connected by a conduit to the tank of feed product ;

a suction-delivery pump with piston interposed on the conduit between the said tank and said pouring spout, the piston of the pump being driven by a rack rod ;

a second motor for driving said pump and a pinion moved by this motor and meshing on said rack rod ;

a programmed control device associated respectively with the motor actuating the carriage and with the pump and suitable for stopping the carriage opposite each individual box and starting the motor of the piston pump distributing the feed liquid, and for limiting the amplitude of the movement of the piston, thus proportioning the quantity of feed product distributed to each box, said programmed control device consisting of a first switch controlling the stopping of the motor driving the carriage, a second switch controlling the starting of the motor driving the pump, means sensitive to the passage of the carriage in front of a fixed mark, corresponding to the positioning of the carriage in front of a box to be fed, these means being suitable for bringing said switches into active position, a drum mounted to rotate along a vertical axis on the carriage, the drum comprising a plurality of stops adjustable in height and regularly distributed on the cylindrical wall of said drum, each stop brought by the rotation of the drum into active position being suitable for limiting the high stroke of the rack rod controlling the displacement of the piston, the drum further comprising a step-by-step advance device for successively bringing the said stops into active position after the carriage is restarted each time, a first high switch integral with said rod of said piston and suitable for bearing against the stop disposed on the drum and placed in active position on the path of said switch, said first high switch being suitable for causing the reversal of the direction of drive of the motor driving the pump and for causing the delivery of the sucked in liquid, a second switch sensitive to the arrival of the piston in low position at the end of delivery and suitable for causing the stopping of the motor driving the pump and the restarting of the motor driving the carriage.

4. An apparatus for automatically distributing individual rations as defined in claim 3, in which the step-by-step drive device of the drum is constituted by a ratchet wheel integral with the drum, a lever suitable for maneuvering an arm driving the ratchet wheel and for undergoing the action of the piston rod driven downwardly into delivery position.

* * * * *